United States Patent [19]

McGaffigan et al.

[11] Patent Number: 5,128,504

[45] Date of Patent: Jul. 7, 1992

[54] REMOVABLE HEATING ARTICLE FOR USE IN ALTERNATING MAGNETIC FIELD

[75] Inventors: Thomas H. McGaffigan, Half Moon Bay, Calif.; Ernest R. Fenton, Topsfield, Mass.

[73] Assignee: Metcal, Inc., Menlo Park, Calif.

[21] Appl. No.: 511,746

[22] Filed: Apr. 20, 1990

[51] Int. Cl.$^5$ .............................. H05B 6/10
[52] U.S. Cl. ................ 219/10.43; 219/10.491; 219/10.53; 219/10.75; 219/85.11; 156/272.4
[58] Field of Search ............ 219/10.491, 10.53, 10.43, 219/10.41, 10.57, 10.75, 10.79, 85.11, 10.55 F, 10.55 R; 156/272.4, 274.2, 379.6, 380.2

[56] References Cited

U.S. PATENT DOCUMENTS

| | | | |
|---|---|---|---|
| 1,975,436 | 10/1934 | Sorrel et al. | 219/13 |
| 1,975,437 | 10/1934 | Sorrel et al. | 219/13 |
| 1,975,438 | 10/1934 | Sorrel | 219/13 |
| 3,191,132 | 5/1965 | Mayer . | |
| 3,309,633 | 3/1967 | Mayer . | |
| 3,391,846 | 7/1968 | White | 229/17 |
| 3,461,014 | 8/1969 | James | 156/272 |
| 3,510,619 | 5/1970 | Leatherman | 219/10.53 |
| 3,528,867 | 9/1970 | Leatherman | 156/272 |
| 3,548,140 | 12/1970 | O'Neill | 219/10.53 |
| 3,551,223 | 12/1970 | Deal et al. | 149/15 |
| 3,709,775 | 1/1973 | James | 161/162 |
| 3,902,940 | 9/1975 | Heller et al. | 156/79 |
| 3,945,867 | 3/1976 | Heller, Jr. et al. | 156/143 |
| 4,035,547 | 7/1977 | Heller, Jr. et al. | 219/10.53 |
| 4,107,506 | 8/1978 | Pelegri | 219/85 A |
| 4,223,209 | 9/1980 | Diaz | 219/549 |
| 4,256,945 | 3/1981 | Carter et al. | 219/10.75 |
| 4,307,277 | 12/1981 | Maeda et al. | 219/10.55 R |
| 4,341,936 | 7/1982 | Virgin | 219/10.79 |
| 4,347,487 | 8/1982 | Martin . | |
| 4,369,284 | 1/1983 | Chen | 524/476 |
| 4,499,438 | 2/1985 | Cornellius et al. . | |
| 4,555,422 | 11/1985 | Nakamura et al. . | |
| 4,654,511 | 3/1987 | Horsma et al. | 219/548 |
| 4,665,309 | 5/1987 | Derbyshire | 219/551 |
| 4,695,712 | 9/1987 | Busch | 219/10.41 |
| 4,695,713 | 9/1987 | Krumme | 219/553 |
| 4,699,743 | 10/1987 | Nakamura et al. . | |
| 4,749,833 | 6/1988 | Novorsky | 219/10.53 |
| 4,777,063 | 10/1988 | Dubrow et al. | 427/44 |
| 4,789,767 | 12/1988 | Doljack | 219/9.5 |
| 4,814,546 | 3/1989 | Whitney et al. . | |
| 4,823,106 | 4/1989 | Lovell | 338/212 |
| 4,865,905 | 12/1989 | Uken | 428/220 |
| 4,914,267 | 4/1990 | Derbyshire | 219/85.1 |

FOREIGN PATENT DOCUMENTS

| | | | |
|---|---|---|---|
| 52-30938 | 3/1977 | Japan | 219/10.55 M |
| 1076772 | 3/1964 | United Kingdom . | |

OTHER PUBLICATIONS

Lee, E. W., *Magnetism, An Introductory Survey*, (1970) pp. 201-204.
Murakami, K. *IEEE Transactions on Magnetics* (Jun. 1965) pp. 96-100.
Smit. et al., *Ferrites* (1959) pp. 155-160.
Smith et al., *Adv. Electronics*, 6:69 (1954).

*Primary Examiner*—Philip H. Leung
*Attorney, Agent, or Firm*—Burns, Doane, Swecker & Mathis

[57] ABSTRACT

This invention provides a system for providing heat to a substrate in an alternating magnetic field using lossy heating particles. This invention in particular discloses an article which is a combination of a base material and lossy heating particles capable of producing the desired heat and capable of being self-regulating at a preselected Curie temperature when subjected to an alternating magnetic field. The article of this invention is adapted to be placed on a substrate in order to heat the substrate in an alternating magnetic field and is adapted to provide the removal of the particles from the substrate after the heating is completed. Preferred materials for the article of this invention are gel materials having a cone penetration of at least about $50(10^{-1}$ mm) and at least about 100% elongation. Preferred magnetic particles for use in this invention include the combination of lossy heating particles, alone or in combination with nonlossy particles for maintaining the magnetic circuit coupling while the lossy heating particles are at the Curie temperature.

19 Claims, 2 Drawing Sheets

REMOVABLE HEATING ARTICLE FOR USE IN ALTERNATING MAGNETIC FIELD

RELATED APPLICATIONS

This application is a continuation-in-part of U.S. Ser. No. 07/242,208 filed Sept. 9, 1988 now abandoned and is a continuation-in-part of U.S. Ser. No. 07/404,621 filed Sept. 8, 1989.

FIELD OF THE INVENTION

This invention relates to articles, methods and systems for providing heat to selected substrates by subjecting the substrate and a removable article comprising magnetic particles to an alternating magnetic field.

BACKGROUND OF THE INVENTION

The use of ferrite particles to produce heating in alternating magnetic fields is known in the art. As disclosed in U.S. Pat. No. 3,391,846 to White, and U.S. Pat. No. 3,902,940 to Heller et al., ferrite particles have been used to produce heat where it is desired to cause chemical reactions, melt materials, evaporate solvents, produce gases, and for other purposes.

PCT International Publication WO84/02098 (Application No. PCT/US83/01851 corresponding to the U.S. Pat. No. 4,914,267) of Derbyshire discloses the use of ferromagnetic materials having the desired Curie temperature in electrically conductive layers to provide auto-regulated heating to the Curie temperature of the material upon application of an alternating current to the conductive layer of ferromagnetic material. The power applied to the ferromagnetic layer is in the form of an alternating current source which produces skin effect or eddy current heating in the continuous ferromagnetic layer. As the ferromagnetic layer reaches the Curie temperature, the permeability of the layer drops and the skin depth increases, thereby spreading the current through the wider area of the ferromagnetic layer until the Curie temperature is achieved throughout and the desired heating is achieved.

In my copending applications referred to above and incorporated herein by reference, I disclose the use of magnetic particles in combination with heat-recoverable articles in alternating magnetic fields to effect recovery. In connection with those systems, I have observed that it would be desirable to have a different form of self-regulating, self-heating articles which can be used more conveniently in some applications to heat various substrates and materials.

Therefore, it is an object of this invention to provide an improved article and an improved system for providing heat to substrates using alternating magnetic fields.

SUMMARY OF THE INVENTION

I have now found that the above objects and other utilities and benefits can be achieved by providing an article which can be placed on the surface of the substrate to be heated wherein the article comprises lossy heating particles which produce the desired heat and accomplish the heating of the substrate when subjected to an alternating magnetic field, wherein the article is adapted to provide removal of the particles from the substrate, after heating the substrate either by removing the article carrying the particles or by removing the particles from the article.

In one aspect, this invention is an article adapted for providing heat to a substrate in an alternating magnetic field comprising in combination:

a base material; and lossy heating particles carried by the base material which particles have a Curie temperature at least equal to the temperature to which the substrate is to be heated and which have sufficiently high permeability and are sufficiently highly lossy to produce the desired heat when subjected to an alternating magnetic field, wherein the base material carrying the particles is adapted to be placed on a surface of the substrate for heating the substrate and is adapted for removal of the particles from the substrate after heating the substrate in an alternating magnetic field.

In one preferred aspect of this invention, the above article is adapted to be removably placed on the substrate and is removed from the substrate after the desired heating has been accomplished, thereby removing the particles from the substrate.

In another preferred aspect of this invention, the above article is provided with adhesive means for removably adhering the article to a surface of the base material whereby the article can be applied to the substrate to be heated, then the particles removed from the surface of the base material after the heating has been accomplished, for example, by washing with a liquid.

In another preferred aspect of this invention, the article is in the form of a tape having at least 100% elongation, and is more preferably a gel-type material having at least 200% elongation, which provides the article the capability of being stretched onto a substrate for heating in an alternating magnetic field so that the tape will change dimension with the substrate when it changes dimension or shape when heated, such as heat recoverable substrates.

In another preferred aspect of this invention, the magnetic particles present in the article comprise a combination of lossy heating particles for producing heat and non-lossy particles for providing consistent or improved magnetic circuit coupling during heating.

In another aspect, this invention is a method of heating a substrate comprising:

placing on a surface of the substrate an article comprising a base material and lossy heating particles carried by the base material which particles have a Curie temperature at least equal to the temperature to which the substrate is to be heated and which have sufficiently high permeability and are sufficiently highly lossy to produce the desired heat when subjected to an alternating magnetic field wherein the article is adapted to provide removal of the particles after heating the substrate;

subjecting the substrate having said article on a surface thereof to an alternating magnetic field to produce the desired heating of the substrate; and removing the article from the substrate.

In another aspect, this invention is a system for heating a substrate comprising, in combination:

a substrate to be heated;

an article on a surface of the substrate comprising a base material and lossy heating particles carried by the base material which particles have a Curie temperature at least equal to the temperature to which the substrate is to be heated and which have sufficiently high permeability and are sufficiently highly lossy to produce the desired heat when subjected to an alternating magnetic field wherein the article is adapted to provide removal of the particles after heating the substrate;

an induction coil adapted to produce said magnetic field; and a power supply being adapted to provide power to the induction coil as alternating current at a preselected frequency effective for heating said particles.

In another aspect, this invention is an assembly comprising:

an induction coil adapted to produce a magnetic field;

a substrate positioned in said alternating magnetic field having on a surface of the substrate an article adapted for heating the substrate and adapted for removal from the substrate after heating wherein the article comprises a base material and lossy heating particles carried by the base material which particles have a Curie temperature at least equal to the temperature to which the substrate is to be heated and which have sufficiently high permeability and are sufficiently highly lossy to produce the desired heat when subjected to an alternating magnetic field and wherein the article is adapted to provide removal of the particles after heating the substrate; and a power supply connected to said induction coil, said power supply being adapted to provide power to the induction coil as alternating current at a preselected frequency effective for heating said particles.

In a preferred aspect, the power supply used in the above methods, systems and assemblies is a constant current power supply.

DESCRIPTION OF THE INVENTION

This invention utilizes the phenomenon that lossy magnetic particles, such as lossy ferrites, produce heat when subjected to an alternating magnetic field of an appropriate frequency. These lossy heating particles are self-regulating with respect to the maximum temperature they will heat to in the appropriate alternating magnetic field because they exhibit a decline in magnetic permeability and hysteresis losses as the Curie temperature is approached and reached. When the Curie temperature is achieved, the magnetic permeability of the ferrite particles drops significantly, the hysteresis losses diminish and the particles cease to produce heat from the alternating magnetic field. This property of being self-regulating at a maximum temperature equal to the Curie temperature of the particles makes them particularly useful in many applications.

In my copending application, U.S. Ser. No. 07/404,621, magnetic particles which function as lossy heating particles are incorporated into or coated onto heat recoverable substrates in order to heat those substrates in alternating magnetic fields. In many instances, the magnetic particles can be conveniently incorporated into or coated onto the surface of the substrate to be heated. However, in other instances, it is inconvenient and/or economically impractical to incorporate the magnetic particles into the substrate material or coat the magnetic particles onto the substrate material in order to heat the substrate in the alternating magnetic field. Consequently, I have developed the present invention in order to provide a more convenient and economical form in which lossy magnetic heating particles can be used in many applications to heat substrates in alternating magnetic fields.

In one preferred form, the present invention provides a base material in a sheet or tape form which carries the lossy heating particles for producing heat in an alternating magnetic field. The base material is adapted to be removably placed on the surface of a substrate to be heated where it remains in contact or in thermal proximity with the surface of the substrate during exposure to an alternating magnetic field of an appropriate frequency for heating the particles. The particles are then removed by removing the base material from the surface of the substrate after the desired heating in the magnetic field has been accomplished. This invention thereby provides a convenient and economical means for heating practically any substrate in an alternating magnetic field without the necessity of incorporating magnetic particles in the substrate or coating the particles on the substrate.

Figure 1:
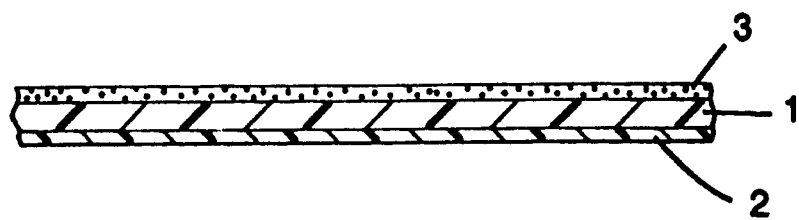
FIG. 1 illustrates in cross section a tape article according to one embodiment of this invention.

In an example of one embodiment of the present invention, the configuration illustrated in FIG. 1 can be employed. In this example, the article of this invention comprises base material 1 having adhesive means 2 on one surface thereof which is utilized by removably attaching the base material to a substrate to be heated in an alternating magnetic field, then removing the base material from the substrate after the heating is completed. On the other surface of the base material 1 is a layer of lossy heating particles 3 which produce the heat when subjected to the alternating magnetic field. Such an article can be conveniently made and utilized as a tape in a conventional roll, optionally with a release paper, so that the tape forms of the article can be conveniently used as the craft personnel are accustomed to using tape.

Figure 2:
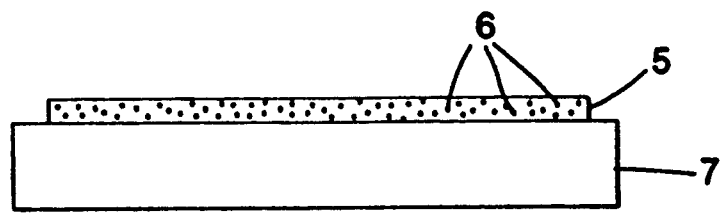
FIG. 2 illustrates in cross section an embodiment according to this invention comprising the combination of a heating tape article on the surface of a substrate to be heated.

In another embodiment illustrated in FIG. 2, tape 5 comprises a base material having the lossy heating particles 6 dispersed in the base material. Tape 5 is applied to the surface of substrate 7 and is held on the surface by any appropriate means, including mechanical force, adhesive means or other means. After substrate 7 has been heated in an alternating magnetic field, tape 5 is then removed from substrate 7.

In this invention the base material may be any material suitable for carrying the lossy heating particles and suitable for being removably placed on the substrate for heating then removed. Thus, the base material can be polymeric, a woven or nonwoven fabric of natural or synthetic materials or other material. The base material can be rigid, such as where it is desired to cause the substrate to soften or melt and conform to a shape of the base material, as in a molding method. In most applications, however, the base material will be flexible so the article can conform to the substrate to provide effective thermal contact and heating of the substrate. In a preferred form the base material will also have a certain degree of elongation to further enable the article to conform to the substrate. Thus, elastomeric type materials are particularly useful as the base material in the article of this invention.

In a preferred embodiment of this invention the base material is one which has an elongation of at least about 100%. This property of the base material enables the use of the article of this invention by stretching the article around or against the substrate to be heated. The elongation property enables the article to be held firmly in place on the surface of the substrate without adhesive or other means and enables the article to change shape and follow any change in shape, such as shrinking, that occurs in the substrate during the heating. However, if desired, the article may also have an adhesive surface to assist in proper contact of the article with the substrate. As mentioned above, the lossy heating particles can be on either surface of article or can be dispersed in the base material of the article. By stretching the article over the substrate, intimate thermal contact is assured.

In another preferred embodiment of the present invention, the base material comprises a very soft, highly elastic "gel" type of material which can be used in the form of a tape or sheet and which has a number of advantages which result from the unique combination of properties of the gel materials. A preferred material is one which is very soft, i.e., having a cone penetration value according to ASTM D217-68 of at least about 50 ($10^{-1}$ mm) and preferably at least about 100 ($10^{-1}$ mm) In addition, it is preferred that the material have at least 100% elongation according to ASTM D638-80 and preferably at least about 200% elongation. Examples of such gel-like materials which are preferred for the present invention include the various "Kraton" (Trademark of Shell Chemical Co.) polymers from Shell Chemical, Houston, Texas. While there is a wide range of Kraton materials available, many grades of the Kraton polymers have the above desired cone penetration and elongation characteristics. Blends of certain Kraton materials are also useful as base material in the present invention. For example, see Chen, U.S. Pat. No. 4,369,284. Other materials which have similar physical properties and are particularly useful as base material in the present invention are the polyurethane materials of Uken, U.S. Pat. No. 4,865,905, particularly in the form of the gel impregnated in a flexible matrix disclosed therein, and the polysiloxane materials of Dubrow et al. in U.S. Pat. No. 4,777,063. The disclosures of the above patents ar incorporated herein by reference.

The properties of these gel materials which are particularly useful in the present invention include the soft nature of the material in combination with the high elongation which makes these materials particularly suitable for placement on or wrapping around a substrate to be heated. These materials are highly conformable to an irregular shape of a substrate. Moreover, due to the elongation, these materials can be stretched on or around a substrate such as a heat-recoverable article which changes geometric shape during heating. When the substrate changes shape, such as by shrinking, these gel materials will contract and continually conform to the shape of the substrate regardless of the irregular shape that the surface of the substrate may result from the heating. This is a particularly useful aspect in the present invention because such a gel tape containing or carrying the lossy heating particles will thereby continually keep the lossy heating particles in close contact with the substrate while the substrate is being heated. This capability of initial and continual conformance is important in delivering heat to difficult heat shrink articles such as boots and branch-off arrangements where it is essential but difficult to heat the crotch area until full recovery is effected.

Another useful property which these gel-type base materials have is a tacky or adhesive surface, which is useful in the present invention in that the surface of the gel base material can provide the adhesive means for temporarily adhering the article of this invention to the substrate to be heated, and thereby provide the means for easy removal of the article from the substrate after the heating is completed. In addition, the tacky surface or adhesive surface of the gel material being used as base material in the present invention can also be utilized to hold the lossy heating particles on the base material, thereby forming the articles of this invention comprising the base material and lossy heating particles. Further, the lossy heating particles can be applied to one surface of the gel base material and the other surface of the gel material applied to the substrate to be heated, or the lossy heating particles can be adhered to one surface of the gel base material, then the same surface applied to the surface of the substrate to be heated, thereby providing a closer contact of the lossy heating particles with the substrate to be heated. When the gel base material is removed from the substrate after heating, the lossy heating particles continue to adhere to the gel base material and are thereby removed from the surface of the substrate along with the gel base material. Of course, when desired, the lossy heating particles can be incorporated in and dispersed in the gel base material when the article of this invention is manufactured by curing or melting the gel material as referred to in the above referenced patents. Or, the lossy heating particles can be on both surfaces of the base material for some applications.

Other materials may conveniently be used as the base material in the articles of the present invention, including such materials as rubber, fabric, elastomeric foam, and any other material which will be suitable for holding the lossy heating particles in position during heating in an alternating magnetic field and then for removing the base material and the particles when the heating is completed. While the above gel-type base materials are preferred for many applications in the utilization of the present invention, it will be apparent to one skilled in the art that selection of various base materials for use in combination with the lossy heating particles will be straightforward and apparent following the teachings of the present invention.

The lossy heating particles useful in this invention can be any desired particles which have the desired Curie temperature and are sufficiently lossy to produce the desired amount of heating in the alternating magnetic field intended for use in connection with the systems of this invention. As discussed in copending application Ser. No. 07/404,621, incorporated herein by reference, it will be understood by those skilled in the art that these lossy heat producing particles are in general ferromagnetic or ferrimagnetic particles which have a high initial permeability and a high lossy component in a particular frequency range of the alternating magnetic field being used. As also known in the art, the lossy component of ferrite particles is generally that part of the initial relative permeability which contributes to heating. This part is referred to as the $\mu''$ by Chen, *Magnetism and Metallurgy of Soft Magnetic Materials*, page 405 (1986) and Smith et al., *Advanced Electronics*, 6:69 (1954). The higher the $\mu''$ component is for a particular particle, the more effective the particle will be as the lossy heating particles in this invention in producing heat at a particular frequency of the magnetic field. The heat production from such particles in an alternating magnetic field is directly related to the lossy component, particle size, field strength, frequency of the alternating current powering the magnetic field, distribution density of the particles present, as well as other factors known in the art. Particles can be readily selected for their initial magnetic permeability and their highly lossy, heat producing properties in a particular magnetic field having a particular frequency and field strength. The particle size should be greater than at least one magnetic domain but otherwise can be any desired particle size. The smaller particle sizes are generally preferred for more efficient heating in many applications. The distribution density of the particles used in the system of this invention will be determined by various factors, but it is generally desired to use the minimum density of particles which will produce the desired heating in the magnetic field selected for use with those particles.

A particularly preferred and useful particle system for use in the present invention is that disclosed in copending application Ser. No. 07/465,933 filed Jan. 16, 1990. As disclosed in that copending application, lossy heating particles are used in combination with nonlossy particles. The lossy heating particles produce the heat for heating the articles and substrates according to the present invention, while the nonlossy particles provide the continued magnetic circuit coupling when the lossy heating particles reach their Curie temperature and their magnetic permeability is reduced. The combination of lossy heating particles and nonlossy particles are particularly useful in the articles and systems of the present invention for the same reasons as stated in said copending application, including the desire to maintain the full intensity of the magnetic field as the substrate which is being heated changes geometric configuration within the alternating magnetic field. Selection of the particular magnetic particles for use in this invention will be apparent to one skilled in the art following the disclosure herein and the disclosure in said copending applications.

The term "lossy heating particles" as used herein means any particle having particular properties which result in the particles being capable of generating sufficient heat for purposes of this invention when subjected to an alternating magnetic field having a specified frequency. Thus, any particle having these properties and being useful in the present invention is within the scope of this definition. As pointed out herein, there has been inconsistent and/or confusing terminology used in association with materials which respond to magnetic fields. While not being bound by particular terminology, the lossy heating particles useful in this invention generally fall into the two categories of materials known as ferromagnetic materials and ferrimagnetic materials.

In general, the ferrimagnetic particles, such as ferrites, are preferred because they are usually nonconductive particles and because they produce heat by hysteresis losses when subjected to an alternating magnetic field. Therefore, ferrimagnetic particles will produce heating by hysteresis losses in the appropriate alternating magnetic field, essentially regardless of whether the particle size is large or small. Ferrimagnetic particles are also preferred in many end use applications, because the article can remain electrically nonconductive.

Also useful in this invention, and preferred in some applications, are the ferromagnetic particles which are usually electrically conductive. Ferromagnetic particles will produce heating dominated by hysteresis losses if the particle size is small enough. However, since ferromagnetic particles are conductive, larger particles will produce significant heating by eddy current losses.

It is generally preferred in the practice of this invention to provide heating by hysteresis losses because, the particle size can be much smaller for effective hysteresis loss heating than with effective eddy current heating, when the particles are dispersed in a now conducting matrix, i.e., for hysteresis loss heating, the smaller particle size enables more uniform heating of the article and does not degrade the mechanical properties of the material, because the smaller particles can be more dispersed than larger particles and the article can remain nonconductive. The more dispersed, smaller particles thereby usually provide more efficient heating. However, the particle size is to be at least one magnetic domain in size, i.e., the particles are preferably as small as practical but are multi-domain particles.

The heating produced by the lossy heating particles useful in the present invention can be either provided by or can be enhanced by coating the particles with an electrically-resistive coating. As will be recognized by one skilled in the art, particles that are not lossy because they do not exhibit eddy current losses, can be converted to lossy heating particles for use in this invention by placing such a coating on the particles. The coating produces eddy current losses associated with the surface effect of the coated particles. At the same time, particles which are lossy due to hysteresis losses can be enhanced in their effectiveness for some applications by such coatings, thereby providing lossy particles which produce heating both by hysteresis losses and by eddy current losses.

It is known that ferrites can possess any range of Curie temperatures by compounding them with zinc, manganese, cobalt, nickel, lithium, iron, or copper, as disclosed in two publications: "The Characteristics of Ferrite Cores with Low Curie Temperature and Their Application" by Murkami, *IEEE Transactions on Magnetics*, June 1965, page 96, etc., and *Ferrites* by Smit and Wijn, John Wiley & Son, 1959, page 156, etc. Therefore, selection of lossy heating particles to provide desired Curie temperatures will be apparent to one skilled in the art.

In the past there has been some inconsistent usage of terminology with respect to ferromagnetic particles in the past. For example, compare the nomenclature used in White U.S. Pat. No. 3,319,846, and used in Lee, *Magnetism, an Introductory Survey*, Dover Publications, Inc., New York, 1970, FIG. 44, at page 203. The preferred nomenclature is believed to be that of Lee and is primarily used herein. See also Brailsford, *Magnetic Materials*, Methuen & Co. Ltd., London, 1960.

The term "ferromagnetic" has frequently been used to refer to magnetic particles generically regardless of their particular properties. Thus, ferrites have usually been referred to as being "ferromagnetic" or included in the general group of ferromagnetic materials. However, for purposes of this invention, it is preferred to use the terminology shown in FIG. 44 of Lee, referred to above, wherein the magnetic particles are classified in two groups, ferromagnetic and ferrimagnetic. The ferromagnetic particles are usually considered to be electrically conductive materials which have various magnetic properties. The ferrimagnetic particles are usually considered to be electrically non-conductive materials which also have various magnetic properties. Ferrites are usually considered to be electrically non-conductive metal oxides and are thus in the class of ferrimagnetic materials. Both ferromagnetic materials and ferrimagnetic materials can be low-loss, or non-lossy, type of materials, which means they do not have significant energy loss or heat produced when subjected to an electric potential or magnetic field. These nonlossy type of magnetic materials are the kind used in various electric equipment components, such as ferrite cores for coils, where no or minimum energy loss/heat production is desired. However, both these materials can also be the high-loss, or lossy, type of materials, which means they will have significant energy loss and heat production when subjected to an electric potential or alternating magnetic field. It is this class of lossy or highly lossy ferromagnetic and ferrimagnetic materials which are useful as lossy heating particles in the present invention.

Regardless of the labels or terminology for magnetic particles, the magnetic particles useful as and included within the scope of the term "lossy heating particles" for the present invention need merely to have the following properties: (1) having the desired Curie temperature for auto-regulation of the temperature when subjected to an appropriate alternating magnetic field, and (2) being sufficiently lossy, either by hysteresis losses, by eddy current losses, or both, in order to produce the desired heat when subjected to the alternating magnetic field. These particles are referred to as being "highly lossy." While the size of the particles is not particularly important in the present invention, it is desirable to use smaller particles since they can be dispersed more uniformly in the heat-recoverable material or article, thus heating more efficiently and uniformly. As recognized by one skilled in the art, the size of the particle should be no smaller than one magnetic domain, i.e., the particles should be multi-domain size particles.

Similarly, regardless of labels or terminology, the magnetic particles useful as and included within the scope of the term "nonlossy particles" for the present invention need merely to have the following properties: (1) having a sufficiently high magnetic permeability to couple with the magnetic circuit selected for use, (2) being sufficiently nonlossy so that the particles do not produce a significant or an interfering amount of heat in the system at the particular magnetic field frequency and intensity selected for use, and (3) have a sufficiently high Curie temperature so that the particles do not significantly decrease in magnetic permeability in the temperature ranges desired for operation. These particles are referred to as "nonlossy high permeability particles."

The substrates useful in connection with this invention and useful as part of the systems and assemblies of this invention include any material or article which is desirably or advantageously heated in an alternating magnetic field. These substrates can include heat-recoverable articles and materials, thermoplastic materials to be shaped or melted, thermosetting materials which are to be reacted or cured, materials from which gases or solvents are to be removed, as well as other materials which will be apparent to one skilled in the art.

Figure 3:
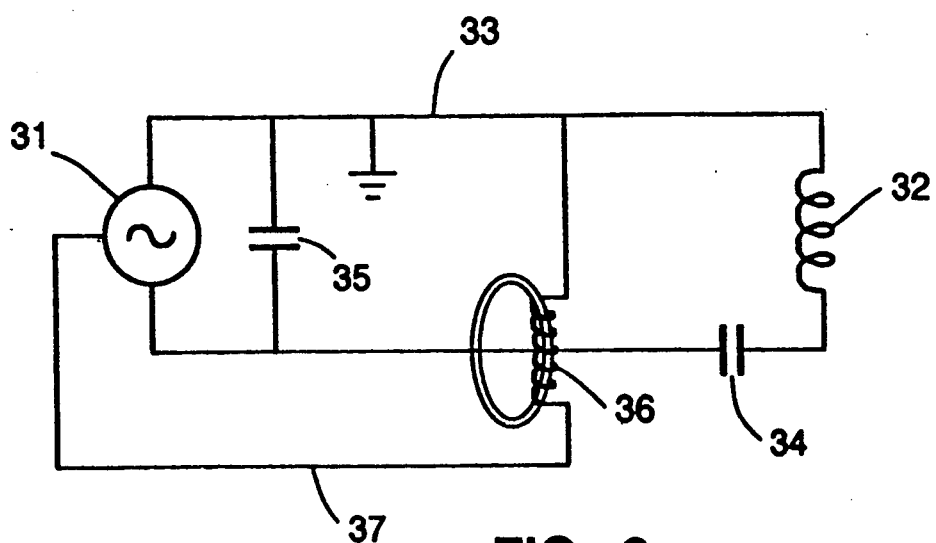
FIG. 3 is a schematic illustration of a system used in this invention.

FIG. 3 shows a typical power supply-induction coil arrangement useful in the present invention and specifically shows the arrangement used in conducting the experiments set forth in the examples of this application. Alternating current power supply 31 is connected to induction coil 32 through means 33 which is part of a circuit formed with series capacitor 34 and parallel capacitor 35. In the particular configuration used in the examples herein, the circuit contained one series capacitor and four parallel capacitors. The circuit was tuned to a resonance impedance of 50 ohms with the load applied. Power source 31 was a constant current power supply Metcal Model BM 300 power supply available from Metcal, Inc., Menlo Park, Calif., which is a 600-watt, 13.56 MHz constant current power supply. The power supply was regulated in the constant current mode by current sensor 36 and feedback loop 37. Induction coil 32 is similar to the induction coil shown in FIG. 4 herein. The coil used in the examples herein contained four turns of 0.187-inch diameter copper tube, insulated with teflon tubing, providing a coil having an inside diameter of 1.790 inches. Other configurations of constant current power supply and induction coil arrangements will be apparent to one skilled in the art.

Figure 4:
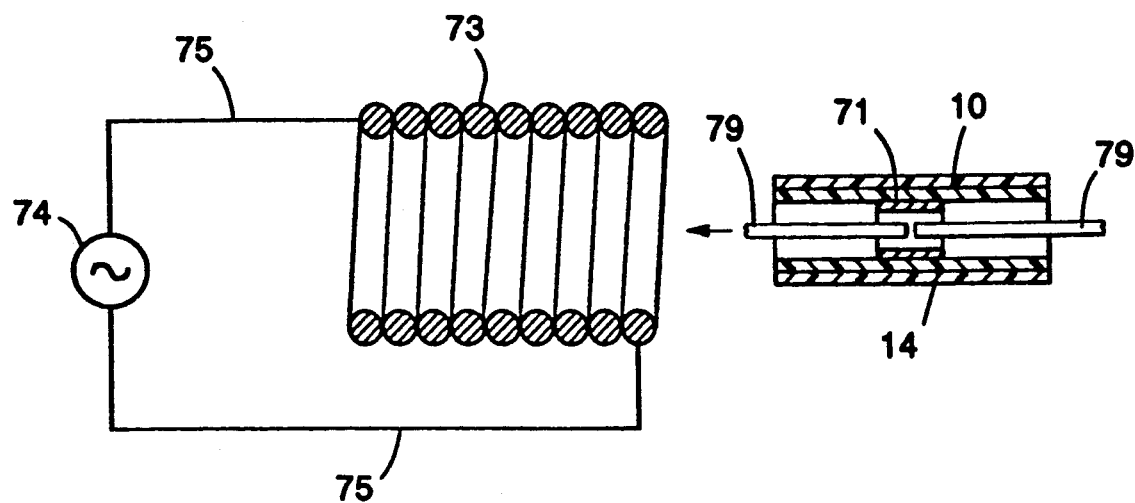
FIG. 4 illustrates in partial cross section a system according to this invention.

FIG. 4 illustrates an embodiment of a system according to this invention wherein article 10 is a tape according to FIG. 1 having lossy heating particles on the outside and adhesive means on the inside. Tape 10 is placed on substrate 14, which is a heat shrink tube containing solder insert 71 and is adapted for connecting wires 79 when tube 14 recovers and solder 71 melts. This connector with lossy heating particle tape 10 thereon is adapted for placement into induction coil 73 (shown in section view), which is connected to alternating current power supply 74 by leads 75. Preferably, the power supply is a constant current power supply as known in the art, for example, see U.S. Pat. No. 4,789,767 to Doljack, incorporated herein by reference. The induction coil, which is adapted for receiving article 10, generates an alternating magnetic field in the area of connector 10, causing the lossy heating particles in tape 10 to generate heat, thereby heating substrate 14.

Figure 5:
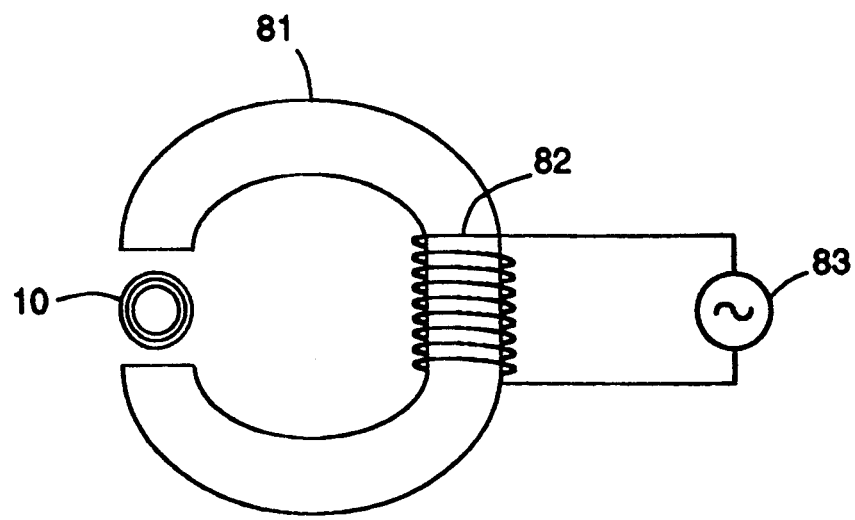
FIG. 5 illustrates in partial cross section an assembly according to this invention.

FIG. 5 illustrates an embodiment of an assembly according to this invention and illustrates another embodiment for generating the alternating magnetic field for use in this invention, split toroid core 81 generates a magnetic field in the area adapted for receiving article 10. Coil 82 is connected to alternating current power supply 83 to produce the desired alternating magnetic field.

In view of the above general description and the description of particular embodiments, it will be apparent to one skilled in the art following these teachings that numerous variations and embodiments of this invention can be adapted for various desired uses.

The following examples are set forth to illustrate particular preferred embodiments of the systems of this invention. It is to be understood that the above description and the following examples are set forth to enable one skilled in the art to practice this invention and the scope of this invention is defined by the claims appended hereto.

EXAMPLE 1

In this example, an article according to this invention was made using a tape of a gel-like material and ferrite particles. The tape was Raychem GelTek 1000 tape available from Raychem Corporation, Menlo Park, Calif. The tape was one inch wide and approximately 0.032 inches thick. The GelTek 1000 tape is a polysiloxane gel material believed to have a cone penetration in the range of about 240 to about 260 mm ($10^{-1}$) and having an elongation of at least about 400%. The polysiloxane gel had been cured by impregnating a flexible matrix which was on open-cell foam structure (see U.S. Pat. Nos. 4,777,063 and 4,865,905). The GelTek 1000 tape has sufficient surface tackiness to cause the ferrite particles to stick to and coat the surface of the tape.

The ferrite powder was TT1-1500 ferrite powder available from Trans-Tech, Adamstown, Md., which is a ferrite powder having a Curie temperature of 180° C. The ferrite powder was coated on one side of the GelTek 1000 tape. Two samples were then prepared using a 1.75-inch diameter heat-shrink tubing having a shrink ratio of about 3:1 and a recovery temperature of about 125° C. The GelTek 1000 tape having the ferrite particles on one surface thereof was stretched around the heat-shrink tubing by stretching the GelTek 1000 tape about 3× in length. The first sample was wrapped with the ferrite particles on the outside surface of the GelTek 1000 tape. In the second sample, the tubing was wrapped with the ferrite particles on the inside surface of the GelTek 1000 tape. Each sample was placed on a 1 inch diameter cable containing nickel plated copper conductors, and the tubing and cable was inserted into the induction coil, which was powered to about 300 watts. Each of the samples heated and the tubing recovered or shrank onto the cable in about 15 seconds. In each sample, the temperature did not exceed the Curie temperature of the particles. Each sample was removed from the induction coil and allowed to cool. The GelTek 1000 tape was removed, thereby removing the particles from the recovered tubing. Even in the sample where the particles were on the inside surface of the GelTek 1000 tape and positioned against the heat-shrink tubing, the particles were plainly removed from the tubing. It should be noted that the nickel plated conductors present in the cables did not heat significantly in the magnetic field. This is due to the fact that the article of the instant invention magnetically shields the underlying substrate and wires. Thus, no undesirable heating occurs in the wires.

EXAMPLE 2

Example 1 was repeated in all respects except that the ferrite particles were a 50/50 mixture of the TT1-1500, which are lossy particles having a Curie temperature of 180° C. and TT2-111 nonlossy particles having a Curie temperature of 375° C. (also available from Trans-Tech). The recovery times, temperature and properties were essentially the same as in Example 1, except that the recovery appeared to be more uniform and appeared to proceed more smoothly than with the TT1-1500 particles alone.

EXAMPLE 3

Example 1 was repeated in all respects except that the substrate was a branch-off molded, heat recoverable boot, having one inlet and two outlet conduits. A similar cable was placed in the inlet and an individual wire was extended through each of the two outlet conduits of the boot. The ferrite particle coated GelTek tape was wrapped, stretching it about 100% to 300%, around the boot, around each single outlet and in the crotch between the two single outlets. In wrapping such a configuration, several parts of the substrate, particularly the branch or crotch area, having several layers of the tape thereon. The wrapped boot with the cable/wires then were placed in the alternating magnetic field and the boot recovered onto the cable and wires in a few seconds. After removing the magnetic field and allowing to cool, the tape was removed from the boot, thereby removing the ferrite particles. It should be noted that, although the tape was not uniform in coverage, i.e., some areas of the substrate had one layer of tape while other areas had several layers of tape, the heating was uniform and no hot spots developed during the heating. This uniform heating was due to the self-regulating aspect of the article of this invention, wherein the maximum temperature produced is the Curie temperature of the particles, regardless of the number of tape layers or amount of particles present.

What is claimed is:

1. An article adapted for providing heat to a substrate in an alternating magnetic field comprising in combination:

a base material; and lossy heating particles which have a Curie temperature at least equal to the temperature to which the substrate is to be heated and which have sufficiently high permeability and are sufficiently highly lossy to produce the desired heat when subjected to an alternating magnetic field, wherein the particles are carried by the base material by being dispersed in the base material or by being adhesively adhered to a surface of the base material, and wherein the base material carrying the particles is characterized by having elastic properties of stretching and recovering enabling the base material to be stretched when placed in contact with the substrate or by having an adhesive means surface enabling the base material to adhere to the substrate, whereby the base material is adapted to be placed on a surface of the substrate for heating the substrate and is adapted for removal of the particles form the substrate after heating the substrate in an alternating magnetic field.

2. An article according to claim 1 wherein the base material is characterized by having an adhesive means surface enabling the base material to adhere to the substrate.

3. An article according to claim 2 wherein the base material comprises a tape having an elongation of at least 100%.

4. An article according to claim 3 wherein the tape comprises a gel material having a cone penetration of at least 100 mm ($10^{-1}$) and an elongation of at least 200%.

5. An article according to claim 1 wherein the base material comprises a tape having an elongation of at least 100%.

6. An article according to claim 5 wherein the tape comprises a gel material having a cone penetration of at least 100 mm ($10^{-1}$) and an elongation of at least 200%.

7. An article according to claim 1 comprising lossy heating particles which are dispersed in the base material.

8. An article according to claim 1 comprising nonlossy particles having high permeability and being capable of providing magnetic circuit coupling through the lossy heating particles.

9. An article according to claim 1 wherein the lossy heating particles are present in the form of an electrically non-conductive layer.

10. An article according to claim 1 wherein the lossy heating particles are ferrimagnetic particles.

11. An article according to claim 1 wherein the lossy heating particles are ferrite particles.

12. An article adapted for providing heat to a substrate in an alternating magnetic field comprising in combination:

a base material; and lossy heating particles which have a Curie temperature at least equal to the temperature to which the substrate is to be heated and which have sufficiently high permeability and are sufficiently higher lossy to produce the desired heat when subjected to an alternating magnetic field, wherein the particles are carried by the base material by being adhesively adhered to a surface of the base material with an adhesive such that the particles can be removed from the surface of the base material after the desired heating is completed, and wherein the base material carrying the particles is characterized by having elastic properties of stretching and recovering enabling the base material to be stretched when placed in contact with the substrate or by having an adhesive means surface enabling the base material to adhere to the substrate, and wherein the base material is adapted to be placed on the surface of the substrate for heating the substrate and adapted to remain on the substrate after heating the substrate and after removing the particles.

13. A method of heating a substrate comprising:

placing a surface of the substrate in contact with an article comprising a base material and lossy heating particles which have a Curie temperature at least equal to the temperature to which the substrate is to be heated and which have sufficiently high permeability and are sufficiently highly lossy to produce the desired heat when subjected to an alternating magnetic field wherein the particles are carried by the base material by being dispersed in the base material or by being adhesively adhered to a surface of the base material and wherein the base material is characterized by having elastic properties of stretching and recovering enabling the base material to be stretched when placed in contact with the substrate or by having an adhesive means surface enabling the base material to adhere to the substrate, whereby the article is adapted to provide removal of the particles from the substrate after heating the substrate; and subjecting the substrate having said article in contact with a surface thereof to an alternating magnetic field to produce the desired heating of the substrate.

14. A method according to claim 13 further comprising the step of removing the article from the substrate after the desired heating has been completed.

15. A method according to claim 13 wherein a constant current power supply is used to power the alternating magnetic field.

16. A system for heating a substrate comprising, in combination:

a substrate to be heated;

an article on a surface of the substrate comprising a base material and lossy heating particles which have a Curie temperature at least equal to the temperature to which the substrate is t be heated and which have sufficiently high permeability and are sufficiently highly lossy to produce the desired heat when subjected to an alternating magnetic field, wherein the particles are carried by the base material by being dispersed in the base material or by being adhesively adhered to a surface of the base material and wherein the base material is characterized by having elastic properties of stretching and recovering enabling the base material to be stretched when placed in contact with the substrate or by having an adhesive means surface enabling the base material to adhere to the substrate, whereby the article is adapted to provide removal of the particles from the substrate after heating the substrate;

an induction coil adapted to produce said magnetic field; and a power supply being adapted to provide power to the induction coil as alternating current at a preselected frequency effective for heating said particles.

17. A system according to claim 16 wherein the power supply comprises a constant current power supply.

18. An assembly comprising:

an induction coil adapted to produce a magnetic field;

a substrate positioned in said alternating magnetic field having on a surface of the substrate an article adapted for heating the substrate and adapted for removal from the substrate after heating wherein the article comprises a base material and lossy heating particles which have a Curie temperature at least equal to the temperature to which the substrate is to be heated and which have sufficiently high permeability and are sufficiently highly lossy to produce the desired heat when subjected to an alternating magnetic field wherein the particles are carried by the base material by being dispersed in the base material or by being adhesively adhered to a surface of the base material and wherein the base material is characterized by having elastic properties of stretching and recovering enabling the base material to be stretched when placed in contact with the substrate or by having an adhesive means surface enabling the base material to adhere to the substrate, whereby the article is adapted to provide removal of the particles from the substrate after heating the substrate; and a power supply connected to said induction coil, said power supply being adapted to provide power to the induction coil as alternating current at a preselected frequency effective for heating said particles.

19. An assembly according to claim 18 wherein the power supply comprises a constant current power supply.

* * * * *

UNITED STATES PATENT AND TRADEMARK OFFICE
CERTIFICATE OF CORRECTION

PATENT NO. : 5,128,504
DATED : July 7, 1992
INVENTOR(S) : Thomas H. McGaffigan, et al.

It is certified that error appears in the above-identified patent and that said Letters Patent is hereby corrected as shown below:

Column 5, line 47, delete "ar" and insert --are-- therefor;

Column 12, line 39, delete "form" and insert --from-- therefor;

Column 12, line 60, delete "no-" and insert --non- -- therefor;

Column 12, line 61, delete "nlossy" and insert --lossy-- therefor;

Column 13, line 11, delete "higher" and insert --highly-- therefor; and

Column 14, line 4, delete "t" and insert --to-- therefor.

Signed and Sealed this

Twenty-fourth Day of August, 1993

Attest:

BRUCE LEHMAN

Attesting Officer     Commissioner of Patents and Trademarks